June 10, 1930.  J. THOMSON ET AL  1,762,899
MACHINE FOR SEPARATING SOLIDS FROM LIQUIDS
Filed May 17, 1928
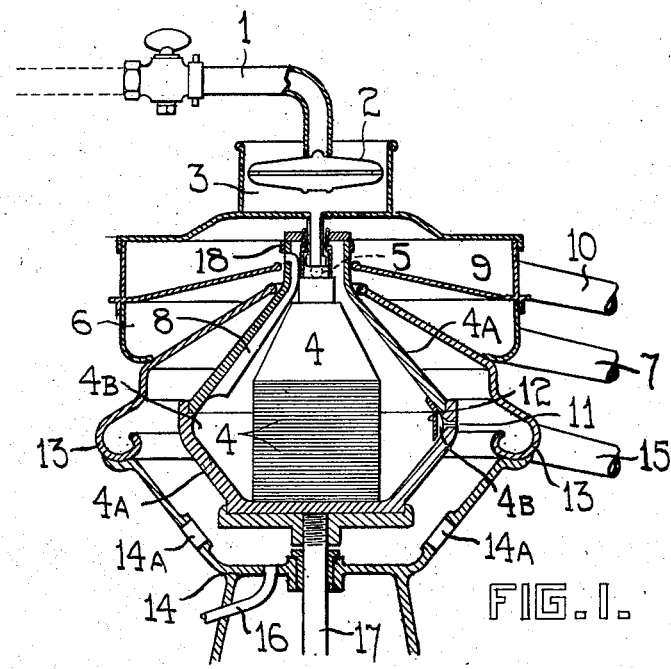
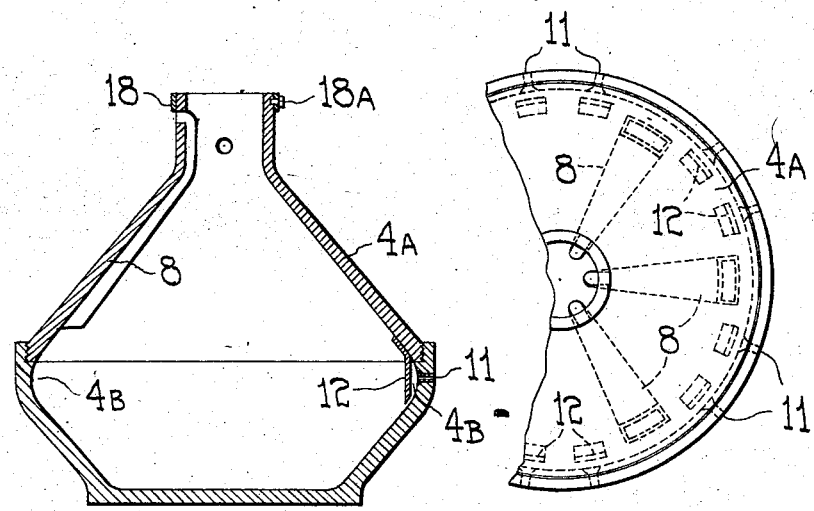
FIG. 1.
FIG. 2.   FIG. 3.
INVENTORS
J. THOMSON
C. E. THOMSON Patented June 10, 1930

1,762,899

UNITED STATES PATENT OFFICE

JAMES THOMSON AND CATHERINE ELIZABETH THOMSON, OF DUNEDIN, NEW ZEALAND, ASSIGNORS OF THREE-FIFTHS TO JOHN WINSLOE, OF DUNEDIN, OTAGO, NEW ZEALAND

MACHINE FOR SEPARATING SOLIDS FROM LIQUIDS

Application filed May 17, 1928, Serial No. 278,598, and in New Zealand July 4, 1927.

This invention relates to means for separating wool-fat from the wash remaining after wool has been scoured, and has for its object the provision of means whereby the dirt contained in the wash is separated from the wool-fat and water at the same time as the wool-fat is separated from the water, so that a simultaneous three part separation is effected. By this means the whole of a wash can be treated in a quick and efficient manner and the wool fat extracted therefrom separately from the dirt and the water.

According to this invention the device employed is of a mechanical nature and similar in principle to the centrifugal milk and cream separator. The latter machine, however, is capable only of a two part separation and is not suitable for the extraction of wool fat from scouring wash, in that, while some separation of the fat from the wash can certainly be effected, the dirt and other foreign matter remains undealt with and owing to its weight will not readily discharge with the water but remains in the separator bowl where it quickly accumulates and causes the separator to cease functioning. This necessitates taking the separator bowl to pieces, cleaning and re-assembling the same before further separation can be effected.

In this invention the principle of the centrifugal separator discs has been retained but the bowl has been modified to conform to the special conditions of working, while means for trapping the dirt and other sediment and delivering it separately and immediately from the bowl have been incorporated with the latter.

The invention will, however, be more particularly described with reference to the accompanying drawing, wherein:—

Figure 1 is a part sectional elevation of an improved machine,

Figure 2 is a sectional elevation of the bowl, and

Figure 3 is a half plan view of said bowl showing in dotted lines, the position of the dirt outlet jets and water discharge passages.

The wash water or waste from a wool scouring plant is passed at a suitable temperature through a pipe 1 and control float 2 to the receiving hopper 3 of a centrifugal separator of special design.

From the hopper 3 the wash is passed to and down the centre of the rotating discs 4 in a bowl 4A and is then thrown outwards between the said discs 4 to their peripheries under the action of the centrifugal force created thereby while the wool fat contained in the wash, being light, passes inwardly towards the suction or vacuum area at the centres of the discs 4 and passes upwards through the ducts usually provided to be discharged through a port 5 into a vessel 6 from which it is run off by means of a spout or nozzle 7.

The wash thrown to the peripheries of the discs 4 comprises water and dirt. The water having been ejected from between the discs immediately tends to rise in the bowl 4A and is passed out of the latter through suitable passage 8 leading upwards to the top of said bowl and opening out of the latter into a vessel 9 fitted with a discharge spout 10. The dirt contained in the wash, being heavier, does not so easily free itself from the centrifugal action of the discs, but is thrown into contact with the interior of the bowl 4A around its greatest periphery, the said bowl being for this purpose bulged outwardly around its periphery at a position 4B about midway of the height of the edges of the discs 4.

This bulging or increasing at 4B of the diameter of the bowl 4A provides a greater space inside the bowl around the edges of the discs 4 than is usual in a centrifugal separator with the result that the upward movement of the water after leaving the discs 4 is made easier and more gradual thereby facilitating the separation and continued outward movement of the dirt and other foreign matter towards the periphery of the said bowl 4A.

Around this bulged portion of the periphery of the bowl 4A are provided a plurality of small jets or openings 11 opening radially from the interior of said bowl to the outside of the latter. Baffles 12 are provided inside the bowl 4A over each of the said jets or openings 11 to prevent the centrifugal action of the discs 4 forcing the wash directly out of the bowl through said jets or openings 11. The heavy slush containing the dirt and the like which has been worked into the bulged portion 4B of the bowl 4A, passes behind the baffles 12 and passes through the jets 11 from which latter it is ejected by the centrifugal force in continuous streams which are caught and collected, in a circular trough 13 formed in the frame 14 of the machine and positioned around the bowl 4A.

The bowl 4A by reason of its rapid rotation within the frame 14 causes a current of air to be carried around with it inside said frame, and this current of air causes the slush caught in the trough 13 to travel around in the latter until it is discharged through a tangential spout 15 opening out of said trough 13.

Openings 14A in the lower portion of the frame 14 provide for the free entry and circulation of air inside the latter, while a drain pipe 16 leading from the bottom of the interior of the frame is provided to carry away any moisture or the like which may not have been caught and disposed of by the trough 13.

The bowl 4A is suitably mounted on the upper end of a vertical shaft 17 which may be driven by any suitable means, such as by an electric motor directly mounted or geared to its lower end.

In order that the water after passing from the discs 4 may not rise so quickly in the bowl 4A as to tend to carry with it the dirt and other matter which it is desired to separate, it is necessary that means be provided whereby the rate of discharge of such water from the bowl 4A can be regulated as required and to suit washes having different percentages of dirt and fat content.

This is most effectively accomplished by means of a ring or band 18 passed over the top end of the bowl 4A and adapted to be clamped in position thereon by means of a set screw 18A. When it is desired to reduce the rate of discharge of water through the passages 8 the ring or band 18 is moved downwardly until it covers or closes the outlet of said passages to a desired extent, when it is again clamped in position by means of the set screw 18A. By this means the area of the outlets of the passages 8 can be restricted or reduced to any desired extent and the quantity of water discharged therethrough consequently regulated.

The jets, vents or openings 11 are preferably removable and renewable in the bowl 4A and any suitable means may be employed in conjunction with them to compensate for or adjust them to take up wear caused by the abrasive action of the dirt and slush constantly being ejected therethrough.

What we claim as new and desire to secure by Letters Patent is:—

1. A centrifugal separator including a frame formed to provide a lower compartment, an intermediate compartment and an upper compartment, the lower compartment being formed to provide an annular trough at a point intermediate its upper and lower ends, a bowl mounted for rotation within and spaced from the wall of the lower compartment, the wall of the bowl being formed intermediate its ends with a series of radially disposed jets in line with the annular trough of the frame, the wall of the bowl inclining inwardly above and below the jets to provide the maximum bowl area in line with the jets, a series of superimposed disks carried by the bottom of the bowl and spaced apart to permit the passage of material from between them, means for delivering material axially of the disks, a series of closed upwardly converging ducts arranged in spaced relation on the inner surface of the bowl with their lower open ends terminating above the radial jets and their open upper ends leading through the wall of the bowl into the upper compartment of the frame, the upwardly diverging wall of the bowl below the jets directing the heavier material separated by centrifugal force to said jets, the lighter material separated by the disks rising in the bowl and through the ducts for delivery in the upper compartment of the frame, and baffles for the jets to prevent direct outward flow therethrough.

2. A centrifugal separator including a frame formed to provide a lower compartment, an intermediate compartment and an upper compartment, the lower compartment being formed to provide an annular trough at a point intermediate its upper and lower ends, a bowl mounted for rotation within and spaced from the wall of the lower compartment, the wall of the bowl being formed intermediate its ends with a series of radially disposed jets in line with the annular trough of the frame, the wall of the bowl inclining inwardly above and below the jets to provide the maximum bowl area in line with the jets, a series of superimposed disks carried by the bottom of the bowl and spaced apart to permit the passage of material from between them, means for delivering material axially of the disks, a series of closed upwardly converging ducts arranged in spaced relation on the inner surface of the bowl with their lower open ends terminating above the radial jets and their open upper ends leading through the wall of the bowl into the upper compartment of the frame, the upwardly diverging wall of the bowl below the jets directing the heavier material separated by centrifugal force to said jets, the lighter material separated by the disks rising in the bowl and through the ducts for delivery in the upper compartment of the frame, and manually adjustable means for controlling the upper ends of the ducts to restrict the flow of material therethrough in order that the rate of discharge of such material may be such as to prevent a corresponding movement of the heavier refuse material.

In testimony whereof we have signed our names to this specification at Dunedin, New Zealand, this 18th day of January, A. D., 1928.

J. THOMSON.
C. E. THOMSON.